United States Patent Office 3,645,903
Patented Feb. 29, 1972

3,645,903
WATER-IN-OIL EMULSION HYDRAULIC FLUIDS
Michael A. Stram, Chicago, and Charles L. Zuraw, Harvey, Ill., assignors to Atlantic Richfield Company, New York, N.Y.
No Drawing. Filed Feb. 14, 1969, Ser. No. 799,506
Int. Cl. C09k 3/00
U.S. Cl. 252—77                                                13 Claims

ABSTRACT OF THE DISCLOSURE

Stable, water-in-oil emulsions are provided by emulsifying water and mineral oil with oil-soluble mixed imides of styrene-maleic anhydride copolymers which are imidized to at least about 50 mole percent and preferably about 100 mole percent. These emulsions can be readily formed by dissolving in mineral oil an emulsifying amount, such as about 2 to 15 percent by weight of the oil, of the mixed imide and mixing with up to about an equal or more amount of water. The oil-soluble mixed imide is the reaction product of a styrene-maleic anhydride copolymer with a dialkylaminoalkylamine, such as dimethylaminopropylamine, and a primary alkylamine, such as N-stearylamine or a $C_{20-22}$ primary alkylamine, in a mole ratio of dialkylaminoalkylamine to primary alkylamine of about 1:3 to less than about 2:1, the total amount of amines being sufficient to imidize at least about 50 mole percent, and preferably about 100 mole percent, of the styrene-maleic anhydride copolymer. These emulsions possess good stability and rust inhibiting properties. They can be used as lubricating compositions and hydraulic fluids.

---

This invetion relates to water-in-oil emulsions. More particularly this invention relates to the novel use of oil-soluble imides of styrene-maleic anhydride copolymers as water-in-oil emulsifiers for mineral oils.

Water-in-oil emulsions are useful as lubricating compositions and as hydraulic fluids. The water-in-oil emulsions are more useful than petroleum oils since they are more fire resistant, have greater cooling effect on equipment, and are less expensive.

It has now been discovered that stable, water-in-oil emulsions are formed by emulsifying water and mineral oil with an oil-soluble mixed imide of a styrene-maleic anhydride copolymer imidized to at least about 50 mole percent and preferably about 100 mole percent, which is the reaction product of the styrene-maleic anhydride copolymer with a dialkylaminoalkylamine and a primary alkylamine in a mole ratio of dialkylaminoalkylamine to primary alkylamine of about 1:3 to less than about 2:1, the sum of the mole equivalents of the total amount of amines being sufficient to imidize at least about 50 mole percent and preferably about 100 mole percent of the anhydride units in the styrene-maleic anhydride copolymer.

The dialkylaminoalkylamine is of the formula

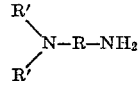

where R is alkylene of 2 to about 30 carbon atoms, preferably 2 to about 5 carbon atoms. R' is alkyl of 1 to about 5, preferably 1 to 2, carbon atoms. Examples of suitable dialkylaminoalkylamines are dimethylaminoethylamine, dimethylaminopropylamine, dimethylaminobutylamine, diethylaminopropylamine, diethylaminoamylamine, dipropylaminopropylamine, diamylaminoamylamine, dimethylaminooctadecylamine and dimethylaminoeicosylamine.

The primary alkylamine is of the formula $R''—NH_2$ where $R''$ is alkyl of about 8 to 30 carbon atoms, preferably about 12 to 25 carbon atoms. A long chain is preferred to impart oil solubility. Examples of suitable primary alkylamines are N-octylamine, decylamine, dodecylamine, octadecylamine, stearylamine, eicosylamine, docosylamine and pentacosylamine.

The mole ratio of dimethylaminoalkylamine to primary alkylamine or fatty amine that is used to react with the styrene-maleic anhydride copolymer should be in the range of about 1:3 to less than about 2:1, preferably about 1:3 to about 1:1, and most preferably about 1:1 to impart emulsion stability to the water-in-oil emulsion.

The ratio of styrene to maleic anhydride in the styrene-maleic anhydride copolymer should be in the range of about 1:1 to 4:1, preferably about 1:1 to 2:1, and most preferably about 1:1. The incorporation of more maleic anhydride, such as a 1:1 mole ratio, affords more anhydride sites to convert to imide chains. The styrene-maleic anhydride copolymer molecular weight may vary from about 500 to 5000, preferably from about 1400 to 5000 and often is in the range of about 1400 to 2500. Higher molecular weight usually increases surface activity of the product.

One way of making the water-in-oil emulsion is to dissolve the mixed imide in the mineral oil in an effective amount to emulsify the water-in-oil, such as in a concentration range of about 2 to 15 percent, preferably about 5 to 10 percent, by weight based on the weight of the oil. The oil may be heated, such as to a temperature of 150° C. if desired to more rapidly dissolve the mixed imide and then the solution is cooled to room temperature, such as 25° C. An amount of water is added and mixed with the mineral oil containing the dissolved mixed imide forming an emulsion. It is desirable to slowly add and mix the water with the mineral oil containing the dissolved mixed imide. From 10 to 55 or more parts by weight of water can be added to 90 to 45 or less parts by weight of the mineral oil containing the mixed imide to form the emulsion. Often 20 to 50 parts by weight of water to 80 to 50 parts by weight of mineral oil are employed. Good results are obtained with an equal amount of water and mineral oil.

The water-in-oil emulsions containing the mixed imides as emulsifiers have good stability. They are useful as hydraulic fluids and also can be used as lubricating compositions. These water in oil emulsions are rust resistant and the mixed imides in the water-in-oil emulsions function as rust inhibitors as well as emulsifiers.

The mineral oil is of lubricating viscosity, and, for instance, can have a viscosity from about 50 to 2000 SUS at 100° F., preferably about 70 to 500 SUS at 100° F. Good results have been obtained with 100 pale oil which is an acid refined, coastal oil having a viscosity of 100 SUS at 100° F. Good results have also been obtained with 1595 oil which is a Mid-Continent neutral oil having a viscosity of 150 SUS at 100° F.

Styrene and maleic anhydride can be polymerized to form polymers for use in this invention by conventional polymerization methods. Solution polymerization methods can be employed where the monomers are polymerized in a suitable solvent using as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. A preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the polymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. The polymer contains a molar ratio of polymerized styrene to polymerized maleic anhydride of about 1:1 to 4:1 and has an average molecular weight of about 500 to 5000, preferably within the range of about 1400 to 5000, and most preferably about 1400 to 2500.

The mixed imide can be prepared by conventional methods, such as by simply heating at imide-forming temperature, the styrene-maleic anhydride copolymer with the dialkylaminoalkylamine and the primary alkylamine in the mole ratios heretofore specified. A temperature of about 125° C. is usually necessary to effect imide reaction and temperatures beyond about 250° C. are generally not utilized in that they may cause undesirable side reactions or degradation of the product. The preferred reaction temperature is from about 140° to 200° C. The reaction may be carried out in bulk but is preferably effected in the presence of a suitable mutual solvent for the reactants, which may, if desired, include the mineral oil in which the reaction product is to be employed. Although the dialkylaminoalkylamine and primary alkylamine can be combined and reacted simultaneously with the styrene-maleic anhydride copolymer, one of these amines can be reacted with the copolymer before the other amine. Thus the amines can be reacted in whole or in part in any desired order. Dropwise addition of the amine reactants is sometimes employed. The total reaction time can vary depending upon the particular reactants employed but will usually range from about 1 to 5 hours up to several days if necessary. The reaction is carried out until the water of reaction ceases to distill from the mixture when imide formation is complete.

A preferred method of preparing the mixed imides is to dissolve the styrene-maleic anhydride copolymer in amyl alcohol by heating to reflux temperature. Then the dialkylaminoalkylamine and the primary alkylamine can be added in the mole ratio of about 1:3 to less than about 2:1, preferably in the range of about 1:3 to about 1:1, and the heating continued at about 145° C. for about an hour. The total amount of amines to the styrene-maleic anhydride copolymer should be sufficient to imidize at least about 50 mole percent and up to 100 mole percent of the anhydride units in the styrene-maleic anhydride copolymer, that is the mole ratio of total dialkylaminoalkylamine and primary alkylamine to styrene-maleic anhydride copolymer mole equivalents should be at least about 1:2 and up to 1:1, the latter ratio giving substantially 100% imide formation. Vacuum can be applied, if necessary or desirable, to boil off amyl alcohol and water. If desired, xylene can be used as a solvent in admixture with the amyl alcohol and distilled off with the water. Imide formation proceeds best when the reaction mixture is heated at a temperature in the range of about 140° to 200° C., although temperatures in the range of about 125 to 250° C. may be employed.

The following examples are illustrative of this invention and include preferred embodiments thereof.

EXAMPLE I

Styrene-maleic anhydride mixed imide of dimethylaminopropylamine and $C_{20-22}$ fatty primary amine In a glass resin kettle fitted with a reflux water condenser, thermometer, nitrogen inlet tube, and mechanical stirrer were put 112.5 g. (0.5 equivalent) of a styrene-maleic anhydride copolymer having a molecular weight of 1700–1900 and a 1:1 mole ratio of styrene to maleic anhydride. The same quantity of amyl alcohol (112.5 g.) was also placed in the kettle. The contents were heated to 145° C. and refluxing occurred as the copolymer dissolved. This was followed by the addition to the contents in the kettle of 25.5 g. (0.25 mole) of dimethylaminopropylamine, herein referred to as DMAPA, and 80.0 g. (0.25 mole) of a commercial primary alkyl amine 20–22 carbon atoms long, herein generically referred to as fatty amine or FA. After heating for 1.0 hour more, vacuum was applied to boil off amyl alcohol and water. The residue (the styrene-maleic anhydride mixed imide product containing a mole ratio of DMAPA/FA of 1.0) was poured out at 100° C., permitted to cool, and herein designated 1.

In a similar manner four other imides of the same styrene-maleic anhydride copolymer were prepared with the same copolymer equivalent of 0.5 and various mole ratios of dimethylaminopropylamine to the $C_{18}$ primary alkylamine, stearylamine or octadecylamine. The imides herein designated 2, 3, 4 and 5, together with imide 1 are listed in Table 1 with their respective mole ratios of DMAPA/FA.

TABLE 1.—MOLE RATIOS OF DMPA/FA IN COPOLYMER IMIDES

| Copolymer imide | Copolymer equivalents | Moles DMAPA | Moles FA | Mole ratio DMAPA/FA |
|---|---|---|---|---|
| 1 | 0.5 | 0.25 | 0.25 $C_{20-22}$ | 1.0 |
| 2 | 0.5 | 0.25 | 0.25 $C_{18}$ | 1.0 |
| 3 | 0.5 | 0.0 | 0.5 $C_{18}$ | 0.0 |
| 4 | 0.5 | 0.125 | 0.375 $C_{18}$ | 0.33 |
| 5 | 0.5 | 0.333 | 0.166 $C_{18}$ | 2.0 |

Imide 3 is not a mixed imide as it contains only octadecylamine. Imide 4 contains more octadecylamine than dimethylaminopropylamine whereas imide 5 contains less octadecylamine than dimethylaminopropylamine.

Solubility in 100 pale oil and in 1595 oil was determined by dissolving 1.0 g. of each imide in 8.0 g. of oil at 150° C., cooling to 25° C., and rating the resultant mixture.

Data on oil solubility of these styrene-maleic anhydride copolymer imides, as determined in the solubility tests, are given in Tables 2 and 3.

TABLE 2.—OIL SOLUBILITY OF COPOLYMER IMIDES

| Copolymer imide | Solubility | |
|---|---|---|
| | 100 pale oil | 1595 oil |
| 1 | Complete (SH) | Homogeneous thickened oil. |
| 2 | Complete | Insoluble. |
| 4 | Complete (SH) | Partially insoluble, haze. |
| 3 | Complete | Complete. |
| 5 | Insoluble | Insoluble. |

NOTE.—(SH) Indicates slight haze.

TABLE 3.—DECREASING ORDER OF SOLUBILITY IN 1595 OIL OF COPOLYMER IMIDES

| Copolymer imide | Mole ratio DMAPA/FA | FA | Solubility in 1595 oil |
|---|---|---|---|
| 3 | 0.0 | N-stearylamine $C_{18}$ | Decreasing. |
| 4 | 0.33 | do | Do. |
| 1 | 1.0 | Commercial $C_{20-22}$ primary alkylamine. | Do. |
| 2 | 1.0 | N-stearylamine $C_{18}$ | Do. |
| 5 | 2.0 | do | Do. |

The results on oil solubility tests show that oil solubility increases when (1) more of fatty amine than dimethylaminopropylamine is reacted with styrene-maleic anhydride copolymer and when (2) the carbon chain length of the fatty amine is extended. Thus the amount of the fatty amine with respect to the dimethylaminopropylamine can be increased or a fatty amine having a longer chain can be used to obtain solubility in the mineral oil. However, the mole ratio of dimethylaminoalkylamine to primary alkylamine is in the range of about 1:3 to less than 2:1 to provide stable water-in-oil emulsions. A primary alkylamine of sufficiently long chain length between about 8 to 30 carbon atoms, preferably about 12–25 carbon atoms, is selected to give oil solubility. The required chain length of primary alkylamine when employed in the range specified, can be readily determined by the simple oil solubility test set forth above.

EXAMPLE II

Water-in-oil emulsions were formulated by dissolving 5.0 g. of styrene-maleic anhydride copolymer imides of Example I as an emulsifier in 50.0 g. of oil at 100° C. and adding slowly 50.0 g. of tap water with vigorous stirring thereby forming a water-in-oil emulsion. A portion (10.0 cc.) of each emulsion was then tested for stability by centrifugation at 1200 r.p.m. for 15.0 minutes and for 30.0 minutes. The results for the water-in-oil emulsions with 100 pale oil and with 1595 oil are shown respectively in Tables 4 and 5.

TABLE 4.—WATER-IN-OIL EMULSIONS WITH 100 PALE OIL STABILITY BY CENTRIFUGE TESTS

| Copolymer imide | 15.0 min. centrifuge | |
|---|---|---|
| | Oil separation (cc.) | Water separation (cc.) |
| 2 | 0.0 | 0.0 |
| 3 | 0.3 | 0.0 |
| 1 | 0.0 | 0.0 |
| 4 | 0.0 | 0.0 |
| | 30.0 min. centrifuge | |
| 2 | Trace | 0.0 |
| 3 | 0.5 | Trace |
| 1 | Trace | Trace |
| 4 | 0.0 | 0.0 |

TABLE 5.—WATER-IN-OIL EMULSIONS WITH 1595 OIL STABILITY BY CENTRIFUGE TESTS

| Copolymer imide | 15.0 min. centrifuge | |
|---|---|---|
| | Oil separation (cc.) | Water separation (cc.) |
| 3 | 0.4 | 0.0 |
| 4 | Trace | Trace |
| 1 | 0.0 | 0.0 |
| | 30.0 min. centrifuge | |
| 3 | 0.6 | 0.0 |
| 4 | 0.3 | Trace |
| 1 | Trace | 0.0 |

These water-in-oil emulsions rated in order of decreasing emulsion stability based on the results of the centrifuge tests are shown in Table 6.

TABLE 6

Decreasing order of stability of water-in-oil emulsions based on centrifuge tests With 100 pale oil:                       With 1595 oil
  1, 2, 4 same _____ 1
  3 _____ 4
  _____ 3

EXAMPLE III

Thermal stability tests were performed by storing 100.0 cc. of each water-in-oil emulsion, formulated as in Example II, in an oven at 42° C. (107.6° F.) and periodically checking the emulsion appearance. Data at 20.0 and 96.0 hour intervals for the water-in-oil emulsions with 100 pale oil and 1595 oil are presented respectively in Tables 7 and 8.

TABLE 7

Water-in-oil emulsions with 100 pale oil thermal stability tests at 42° C.

Copolymer
 imide:           Appearance after 20.0 hr.
  2 _____ No separation, white.
  3 _____ Half separated, yellow.
  1 _____ No separation, white.
  4 _____ No separation, white.

Copolymer
 imide:           Appearance after 96.0 hr.
  2 _____ Slight oil separation, 2.0–2.5 cc./100 cc. emul.
  3 _____ Almost completely separated.
  1 _____ Slight oil separation, 2.0–2.5 cc./100 cc. emul.
  4 _____ Slight break, color change at top and bottom.

TABLE 8

Water-in-oil emulsions with 1595 oil thermal stability tests at 42° C.

Copolymer
 imide:           Appearance after 20.0 hr.
  3 _____ Partially separated.
  4 _____ Partially separated.
  1 _____ No separation.

Copolymer
 imide:           Appearance after 96.0 hr.
  3 _____ Almost completely broken.
  4 _____ Major oil separation.
  1 _____ Slight oil separation, 2.0–2.5 cc./100 cc. emul.

These water-in-oil emulsions rated in order of decreasing emulsion stability based on the results of the thermal stability tests are shown in Table 9.

TABLE 9

Decreasing order of stability of water-in-oil emulsions based on thermal stability tests With 100 pale oil:                       With 1595 oil
  1, 2 same _____ 1
  4 _____ 4
  3 _____ 3

Both the centrifuge tests and the thermal stability tests are in agreement and reveal that the styrene-maleic anhydride imide emulsification ability is greater when more dimethylaminopropylamine is incorporated into the molecule. The free amine group of the dimethylaminopropylamine exerts an attractive force for water with the result that the emulsions are more stable. However, as the dimethylaminoalkylamine exceeds the primary alkylamine, solubility in oil decreases. In these tests, the optimum product was the styrene-maleic anhydride copolymer imide designated 1 made with 0.5 equivalent of a 1:1 mole ratio styrene-maleic anhydride copolymer having a molecular weight of about 1700–1900, 0.25 mole of dimethylaminopropylamine and 0.25 mole of fatty primary amine $C_{20-22}$. This imide is oil soluble and contains enough dimethylaminopropylamine to readily emulsify mineral oil.

EXAMPLE IV

Water-in-oil emulsions formulated as in Example II with styrene-maleic anhydride copolymer imides 1 and 2 as emulsifiers in 100 pale oil were submitted to modified ASTM D665 Turbine Oil Rust Tests. Results of these tests with tap and salt waters are given in Table 10.

TABLE 10.—RUST TEST DATA ON WATER-IN-OIL EMULSIONS

| Copolymer imide | Rating tap water | Rating salt water |
|---|---|---|
| After 24 hours | | |
| 1 | A | A |
| 2 | B | A |
| After 48 hours | | |
| 1 | A | B++ |
| 2 | B | B |

NOTE.—A=no rust—passes; B++=no more than 15 small rust spots; B=no more than 5% of surface rusted.

It is claimed:

1. A stable, water-in-oil emulsion useful as a hydraulic fluid consisting essentially of water and mineral oil of lubricating viscosity emulsified with an effective amount, as an emulsifier, of from about 2 to 15% by weight, based on the mineral oil, of an oil-soluble mixed imide of a styrene-maleic anhydride copolymer which is the reaction product of:
   (a) a styrene-maleic anhydride copolymer containing a molar ratio of polymerized styrene to polymerized maleic anhydride of about 1:1 to 4:1 and having an average molecular weight of about 500 to 5000,
   (b) a dialkylaminoalkylamine of the formula

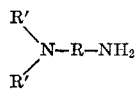

where R is alkylene of 2 to about 30 carbon atoms, and R' is alkyl of 1 to about 5 carbon atoms, and
   (c) a primary alkylamine of the formula R''—$NH_2$ where R'' is alkyl of about 8 to 30 carbon atoms, the mole ratio of dialkylaminoalkylamine to primary alkylamine being in the range of about 1:3 to less than about 2:1 and the sum of the mole equivalents of the dialkylaminoalkylamine and the primary alkylamine being in an amount sufficient to imidize at least about 50 mole percent of the anhydride units in the styrene-maleic anhydride copolymer.

2. A stable, water-in-oil emulsion as set forth in claim 1 wherein the formula of said dialkylaminoalkylamine R is alkylene of 2 to about 5 carbon atoms and R' is 1 to 2 carbon atoms.

3. A stable, water-in-oil emulsion as set forth in claim 2 wherein the formula of said primary alkylamine R'' is alkyl of about 12 to 25 carbon atoms.

4. A stable, water-in-oil emulsion as set forth in claim 3 where the mole ratio of dialkylaminoalkylamine to primary alkylamine is in the range of about 1:3 to 1:1.

5. A stable, water-in-oil emulsion as set forth in claim 1 wherein the dialkylaminoalkylamine is dimethylaminopropylamine and the primary alkylamine is 20 to 22 carbon atoms long.

6. A stable, water-in-oil emulsion as set forth in claim 1 wherein the dialkylaminoalkylamine is dimethylaminopropylamine and the primary alkylamine is N-stearylamine.

7. A stable, water-in-oil emulsion as set forth in claim 1 consisting essentially of from about 10 to 55 parts by weight of water and 90 to 45 parts by weight of mineral oil of lubricating viscosity emulsified with from about 2 to 15 percent by weight, based on the mineral oil, of said oil-soluble mixed imide of styrene-maleic anhydride copolymer.

8. A stable, water-in-oil emulsion as set forth in claim 1 wherein said styrene-maleic anhydride copolymer contains a molar ratio of polymerized styrene to polymerized maleic anhydride of about 1:1 and has an average molecular weight of about 1400–2500.

9. A stable, water-in-oil emulsion suitable for use as a hydraulic fluid consisting essentially of from about 10 to 55 parts by weight of water and from about 90 to 45 parts by weight of mineral oil of lubricating viscosity emulsified with from about 2 to 15 percent by weight, based on the mineral oil, of an oil-soluble mixed imide of a styrene-maleic antydride copolymer which is the reaction product of:
   (a) a styrene-maleic anhydride copolymer containing a molar ratio of polymerized styrene to polymerized maleic anhydride of about 1:1 and having an average molecular weight of about 1400 to 2500.
   (b) a dialkylaminoalkylamine of the formula

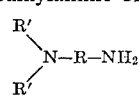

where R is alkylene of 2 to about 5 carbon atoms and R' is 1 to 2 carbon atoms, and
   (c) a primary alkylamine of the formula R''—$NH_2$ where R'' is alkyl of about 12 to 25 carbon atoms, the mole ratio of dialkylaminoalkylamine to primary alkylamine being in the range of about 1:3 to 1:1 and the sum of the mole equivalents of the dialkylaminoalkylamine and the primary alkylamine being in amount sufficient to imidize about 100 mole percent of the anhydride units in the styrene-maleic anhydride copolymer.

10. A stable, water-in-oil emulsion as set forth in claim 9 wherein the dialkylaminoalkylamine is dimethylaminopropylamine and the primary alkylamine is 20 to 22 carbon atoms long.

11. A stable, water-in-oil emulsion as set forth in claim 10 wherein the water and mineral oil of lubricating viscosity are each about 50 parts by weight and the mole ratio of dimethylaminopropylamine to primary alkylamine is about 1:1.

12. A stable, water-in-oil emulsion as set forth in claim 9 wherein the dialkylaminoalkylamine is dimethylaminopropylamine and the primary alkylamine is N-stearylamine.

13. A stable, water-in-oil emulsion as set forth in claim 12 wherein the water and mineral oil of lubricating viscosity are each about 50 parts by weight and the mole ratio of dimethylaminopropylamine to N-stearylamine is about 1:1.

References Cited
UNITED STATES PATENTS

| | | | |
|---|---|---|---|
| 2,607,762 | 8/1952 | Bowen | 260—78.5 T |
| 3,269,946 | 8/1966 | Wiese | 252—77 X |
| 3,329,658 | 7/1967 | Fields | 260—78.5 T |
| 3,365,399 | 1/1968 | Verdol et al. | 252—51.5 |

HERBERT B. GUYNN, Primary Examiner

H. A. PITLICK, Assistant Examiner

U.S. Cl. X.R.

252—49.5, 75, 308, 309, 357